Patented Apr. 18, 1950

2,504,896

UNITED STATES PATENT OFFICE 2,504,896

METHOD OF PREPARING INTERMEDIATES SUITABLE FOR CONVERSION INTO NUCLEAR SUBSTITUTED HETEROCYCLIC COMPOUNDS

Harold R. Snyder and Robert E. Jones, Urbana, Ill., assignors to the United States of America as represented by the Secretary of War No Drawing. Application June 4, 1945, Serial No. 597,587

5 Claims. (Cl. 260—471)

The present invention relates generally to the synthesis of certain nuclear substituted quinoline compounds, and more particularly, to a new and improved method of preparing certain types of intermediates suitable for use in the synthesis of 4-hydroxyquinoline compounds.

As pointed out in the copending application of Price, Roberts and Herbrandson, Serial No. 597,584, filed June 4, 1945, now Patent No. 2,504,875, nuclear substituted 4-hydroxyquinoline compounds may be prepared by cyclizing various beta-phenylaminoacrylates of the type I, or their corresponding isomeric anils (IA)

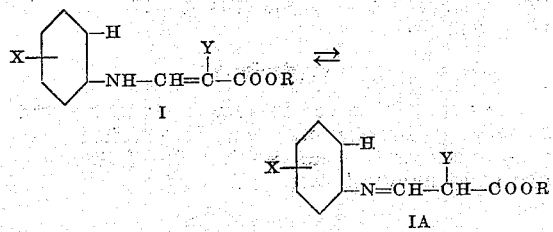

where X is a nuclear substituent and Y is a carbalkoxy group, a cyano group or a substituted carbamyl group. Cyclization of compounds of the foregoing type is accomplished either by fusing the compound itself or by heating a dilute solution of the compound in a high boiling neutral or inert solvent such as diphenyl ether. The process produces high yields of a substituted 4-hydroxy-quinoline compound of the type II

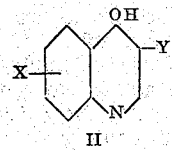

In carrying out the foregoing synthesis, the starting materials I and IA of the type where Y is a substituted carbamyl group have heretofore been prepared by a two step process starting with a primary aromatic amine (III) and an orthoformic ester (IV). In the first step, 2 moles of the amine are condensed with 1 mole of the orthoformic ester to form a formamidine type of compound (V) according to the scheme:

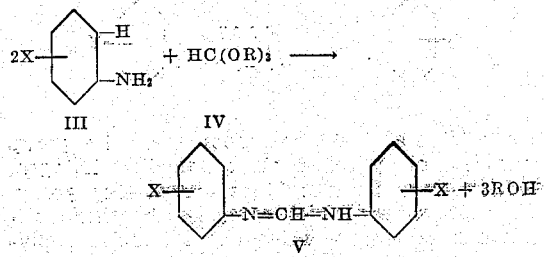

In the second step the formamidine compound is condensed with malonic ester VI according to the scheme:

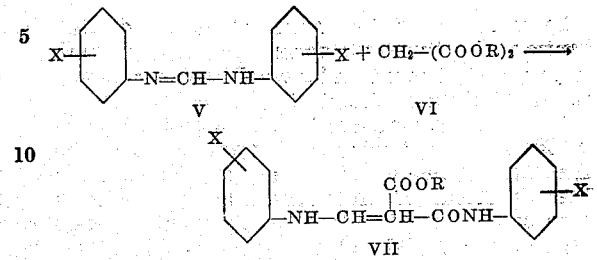

The foregoing method of preparing materials of the type VII, although satisfactory from the viewpoint of yield, is subject to the disadvantage of requiring two steps for the synthesis of a compound which in itself is merely the starting material in a multiple-step synthesis of the desired compounds of the type II.

Broadly stated, the object of the present invention is to provide a new and improved method of synthesizing compounds of the type

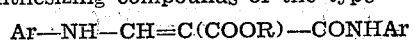

Ar—NH—CH=C(COOR)—CONHAr or their isomeric anils

ArN=CH—CH(COOR)—CONHAr where Ar is an aryl radical and R is an alkyl group.

A more particular object is the provision of an improved method of synthesizing intermediates of the type VIII or their isomeric anils IX

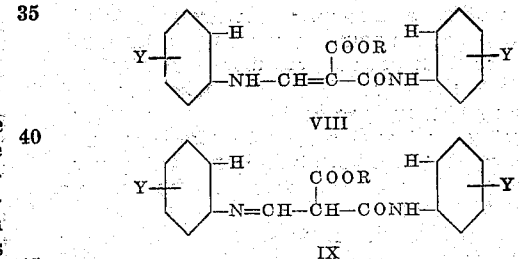

where Y is either hydrogen or one or more nuclear substituents including, inter alia, halogen, alkyl, haloalkyl and alkoxy radicals, and R is an alkyl group.

A still further object is to synthesize compounds of the type VIII and IX in high yields, by a process involving essentially a single step, starting with readily available raw materials.

Other objects and advantages of the present invention will become apparent as the description progresses.

We have found that the foregoing objects may be accomplished by the process of the present invention which is based upon the discovery that the compounds of the type

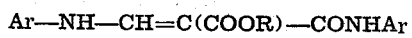
Ar—NH—CH=C(COOR)—CONHAr or their isomeric anils

ArN=CH—CH(COOR)—CONHAr may be prepared essentially in one step by appropriate treatment of a reaction mixture containing about 2 moles of a primary aromatic monoamine, about 1 mole of orthoformic ester and about 1 mole of malonic ester. At a temperature of the order of about 130° C. to about 170° C., this three-component reaction mixture reacts to form the desired type of compound, 4 moles of an alcohol being formed during the process. The reaction may be represented by the following overall scheme:

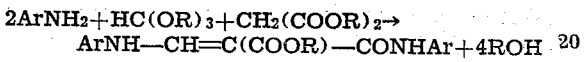
$2ArNH_2 + HC(OR)_3 + CH_2(COOR)_2 \rightarrow$
$ArNH—CH=C(COOR)—CONHAr + 4ROH$ In carrying out the process of the present invention, the three-component reaction mixture is preferably heated under conditions permitting the distillation of the alcohol formed in the reaction, the temperature being maintained within the range indicated until approximately the theoretical amount (4 moles) of alcohol have been collected. When the resulting reaction mixture is cooled, the desired compound usually separates as a solid and may be removed by filtration.

The resulting solid product may be cyclized by heating a dilute solution thereof in a high boiling inert or neutral solvent, for example, mineral oil or diphenyl ether. This operation is preferably carried out under conditions permitting the distillation of a fifth mole of alcohol formed in the cyclization reaction, which may be represented by the following overall scheme:

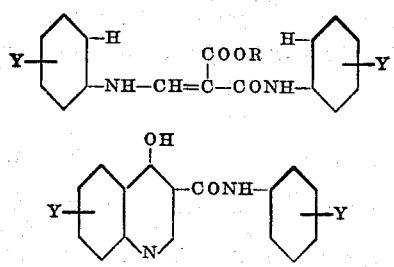

The resulting anilide may be hydrolyzed to the corresponding free acid, for example, by treating the former with aqueous sulfuric acid of about 60 to 75% strength. The free carboxylic acid thus obtained may then be decarboxylated merely by fusing the free acid or by heating a solution of the free acid in a high boiling neutral solvent to a temperature of the order of the melting point of the acid.

In order more clearly to disclose the nature of the present invention a specific example will hereinafter be described in considerable detail. It should be clearly understood, however, that this is done solely by way of example and not for the purpose of delineating the scope of the invention or restricting the ambit of the appended claims.

EXAMPLE

1. *Direct synthesis of 2-carbethoxy-3-(m-chloranilline)-acrylo-m-chloranilide*

Fourteen and eight tenths grams (0.1 mole) of ethyl orthoformate, 25.6 g. (0.2 mole) of m-chloranilline and 16.0 g. (0.1 mole) of malonic ester were mixed in a small flask and heated at 150° C. on a hot plate. After forty-five minutes, 0.4 mole (23 cc.) of ethyl alcohol had distilled and heating was discontinued. After cooling, the oily liquid crystallized immediately upon addition of a trace of the crystalline anilide. The solid was crushed into small pieces and washed three times with small portions of cold ethyl ether. The remaining solid (almost white) was sucked dry and was found to weight 24 g.; M. P. 105–110° C. Mixed with an authentic sample, it melted at 109–114° C.

The ether washings were evaporated and the oil dissolved in aqueous alcohol. Crystallization was induced by seeding and after cooling and filtration, an additional 5 g. of dry product was obtained, M. P. 109–111° C. The total yield was 29 g. (77 per cent).

2. *Cyclization*

The product obtained in the preceding step was cyclized by refluxing for three hours a solution containing about 0.1 mole of acrylate in 1 liter of diphenyl ether. When the reaction mixture was cooled, light brown flakes crystallized. The m-chloranilide of 7-chloro-4-hydroxyquinoline-3-carboxylic acid thus obtained melted at 320–322° C., after recrystallization. The yield was 58% of the theoretical. When cyclization was carried out at twice this dilution, a 75% yield was obtained.

3. *Hydrolysis*

The anilide obtained in step 2 was hydrolyzed by refluxing for five minutes in 75% sulfuric acid which converted the anilide to 7-chloro-4-hydroxyquinoline-3-carboxylic acid.

4. *Decarboxylation*

The acid obtained in step 3 was decarboxylated by fusion at 260–270° C. The fused mass, recrystallized from glacial acetic acid, gave 7-chloro-4-hydroxyquinoline as large white prisms melting at 282.5–286° C. The mixed melting point with an authentic sample (M. P. 280.5–282° C.) was 282.5–286° C.

It will be apparent to those skilled in the art that many variations and modifications may be made in the detailed procedure described in the foregoing specific example. It will also be apparent that the basic principles of the present invention may be applied to the preparation of compounds other than those herein specifically characterized. All such variations, modifications and extensions of the principles of the present invention are to be understood as embraced within the scope of the appended claims.

Having thus described our invention, what we claim as new and wish to secure by Letters Patent is:

1. In the preparation of compounds of the type

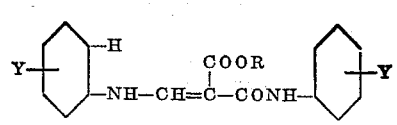

where Y is at least one member of the group consisting of hydrogen, alkyl, haloalkyl, halogen, and alkoxy radicals, and R is a lower alkyl group, the improvement which comprises heating a reaction mixture containing about 2 molar equivalents of a primary aromatic monoamine of the type

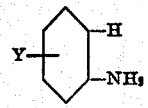

about 1 molar equivalent of an orthoformic ester of the type $HC(OR)_3$, and about 1 molar equivalent of a malonic ester of the type $CH_2(COOR)_2$; said reaction mixture being heated to a temperature and for a time sufficient to cause the splitting out and distillation of about 4 molar equivalents of an alcohol therefrom.

2. In the preparation of compounds of the type

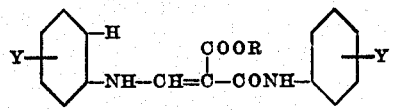

where Y is at least one member of the group consisting of hydrogen, alkyl, haloalkyl, halogen and alkoxy radicals and R is a lower alkyl group, the improvement which comprises heating a reaction mixture containing about 2 molar equivalents of a primary aromatic amine of the type

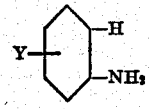

about 1 molar equivalent of an orthoformic ester of the type $HC(OR)_3$, about 1 molar equivalent of a malonic ester of the type $CH_2(COOR)_2$; said mixture being maintained at a temperature of the order of about 130° C. to about 170° C. until about 4 molar equivalents of an alcohol ROH have distilled therefrom.

3. The method of claim 2 wherein said primary aromatic amine comprises m-chloraniline.

4. The method of claim 2 wherein said orthoformic ester comprises ethyl orthoformate and said malonic ester comprises ethyl malonate.

5. The method of claim 2 wherein said reaction mixture, after the distillation of said alcohol therefrom, is cooled and the solid reaction product is separated therefrom.

HAROLD R. SNYDER.
ROBERT E. JONES.

REFERENCES CITED

The following references are of record in the file of this patent:

UNITED STATES PATENTS

| Number | Name | Date |
|---|---|---|
| 2,304,820 | Hanford et al. | Dec. 15, 1942 |
| 2,351,391 | Bergstrom et al. | June 13, 1944 |

FOREIGN PATENTS

| Number | Country | Date |
|---|---|---|
| 42,276 | Germany | Jan. 19, 1888 |

OTHER REFERENCES

Rubtsov: J. Gen. Chem. (U. S. S. R.), vol. 7, pp. 1885–1895 (1937).